July 2, 1946.　　　R. J. SCHAEFER　　　2,403,241
OZONE GENERATING CELL
Filed Aug. 3, 1940　　　3 Sheets-Sheet 1
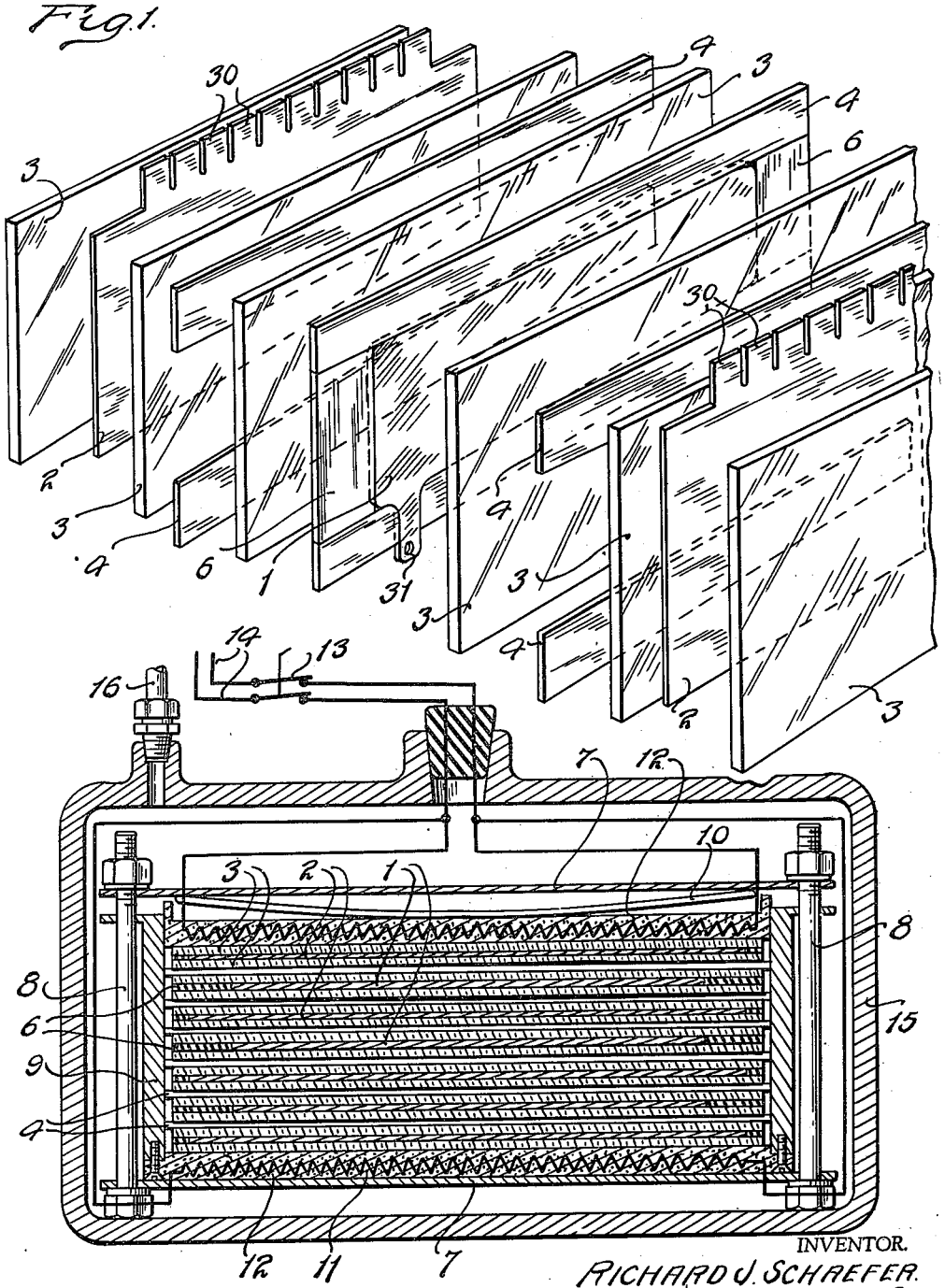
INVENTOR.
RICHARD J. SCHAEFER.
BY
Barnes, Kisselle, Laughlin & Raisch
ATTORNEYS July 2, 1946.　　　R. J. SCHAEFER　　　2,403,241
OZONE GENERATING CELL
Filed Aug. 3, 1940　　　3 Sheets-Sheet 2
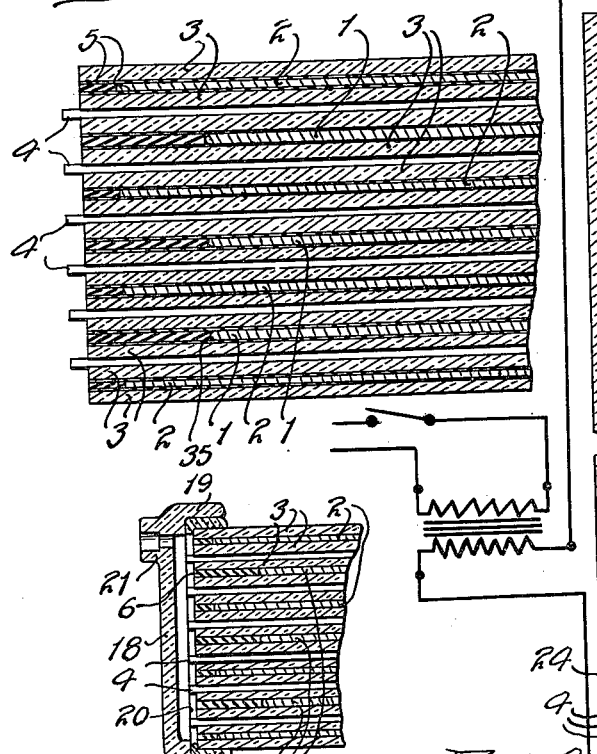
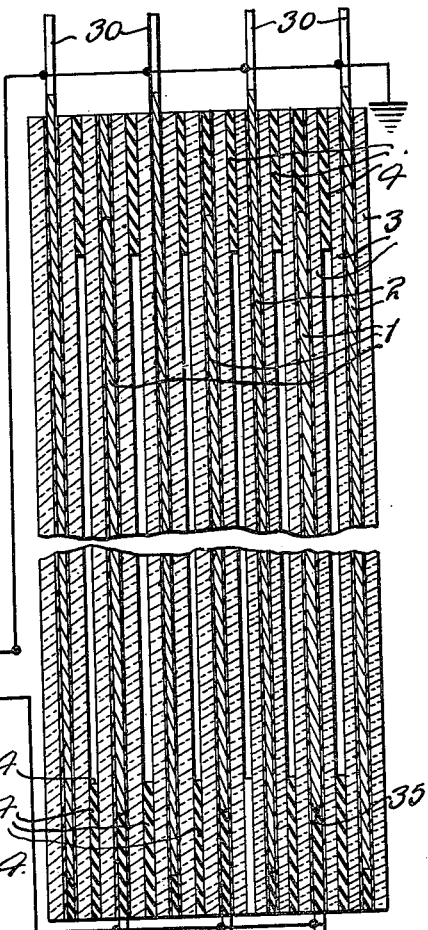
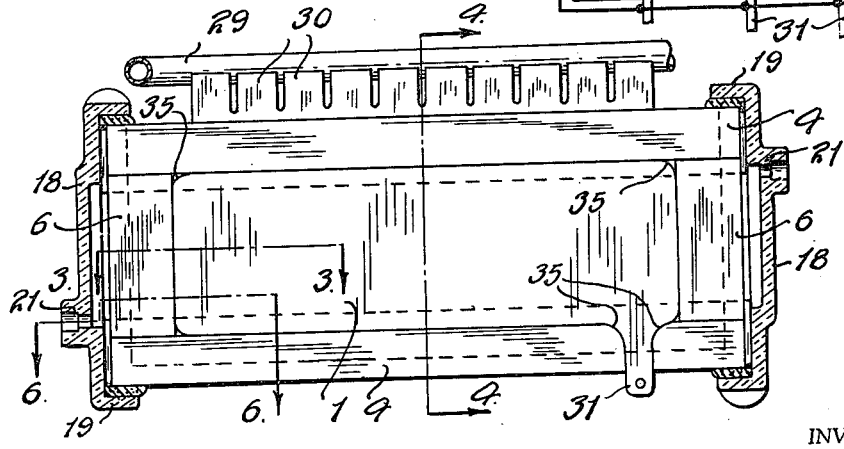
INVENTOR.
RICHARD J. SCHAEFER.
BY Barnes, Kisselle, Laughlin & Raisch
ATTORNEYS.

July 2, 1946.  R. J. SCHAEFER  2,403,241
OZONE GENERATING CELL
Filed Aug. 3, 1940  3 Sheets-Sheet 3
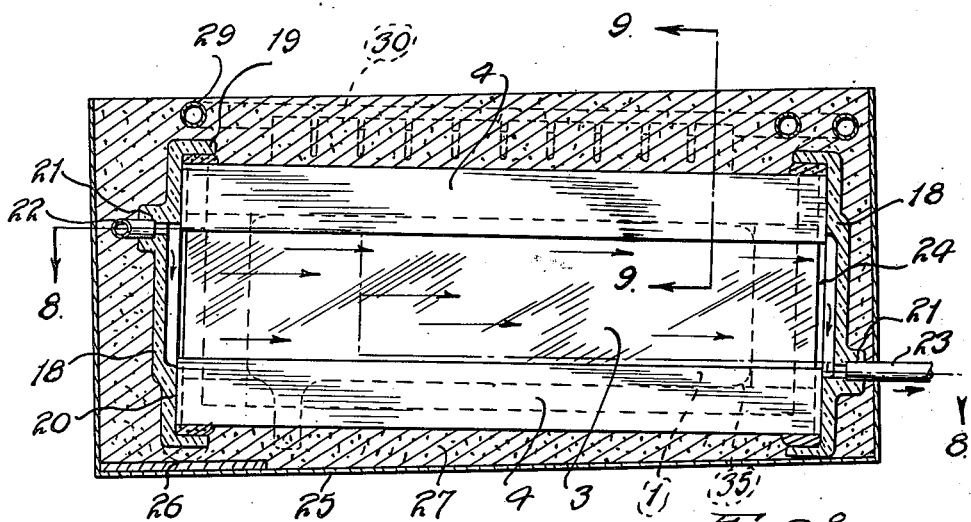
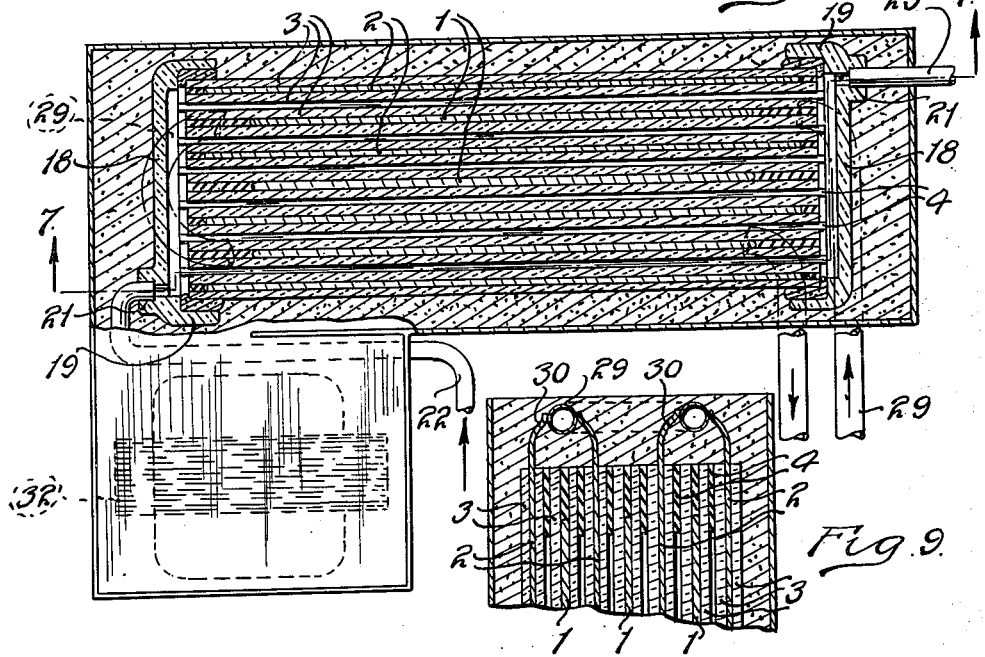
INVENTOR.
RICHARD J. SCHAEFER
BY
ATTORNEYS.

Patented July 2, 1946

2,403,241

UNITED STATES PATENT OFFICE 2,403,241

OZONE GENERATING CELL

Richard J. Schaefer, Detroit, Mich., assignor to Sanozone Corporation, Detroit, Mich., a corporation of Michigan Application August 3, 1940, Serial No. 350,768

7 Claims. (Cl. 204—313)

This invention relates to an ozone cell.

It is an object of this invention to produce an ozone generating cell which can be fabricated cheaply and on a production basis.

Ozone generating cells are not broadly new. Glass is the best dielectric known today and has been used universally in ozone generators. At room temperature glass has good dielectric properties, but as the temperature increases, the dielectric properties of the glass drop off rapidly. In the operation of the ozone cell the high tension glow generates heat. Not infrequently localized arcing occurs which causes the temperature of the glass in the area of localized arcing to rise above that on the remaining portion of the glass, and the hotter area of the glass will expand more than the cooler area and consequently glass will break. To obtain a glass that is not affected by this localized heating, it has been necessary to go to "pyrex" or some other glass having a low temperature coefficient of expansion, as a dielectric, for ozone generators. Glass having a low temperature coefficient of linear expansion, such as "pyrex" (coefficient of linear expansion $.036 \times 10^{-4}$ per degree C.), is expensive and is not of uniform thickness. Since the cost of this low expanding glass is high, the practice has been to operate the ozone cell in the upper regions of the dielectric strength of the glass. This often resulted in the glass being worked at a voltage not consistent with good engineering.

It is an object of this invention to produce an ozone cell in which it is quite practical to use cheap, ordinary sheet glass having a much higher coefficient of linear thermal expansion ($.107 \times 10^{-4}$ per degree C.) than "pyrex." This ordinary sheet glass can be purchased for about six cents (.06¢) per square foot compared to about one dollar and fifty cents ($1.50) per square foot for "pyrex" glass of equivalent thickness. Ordinary commercial sheet glass has greater uniformity of thickness than "pyrex." This object is achieved by properly cooling the cell so that the individual pieces of glass are kept at a uniform temperature throughout the operation of the cell.

This invention also contemplates an ozone generating cell which is economical and dependable in operation and which is particularly free from dielectric glass breakage. This object is achieved by mounting the glass so that it is unconfined and free to expand and contract due to temperature change.

In the drawings:

Fig. 1 is an exploded view showing the high and low potential electrodes and the intervening glass dielectric in the order of assembly.

Fig. 2 is a plan view showing the cell in the jig during assembly with the vacuum housing in horizontal section.

Fig. 3 is a section along the line 3—3 of Fig. 5.

Fig. 4 is a section along the line 4—4 of Fig. 5.

Fig. 5 is a vertical section through the ozone cell along the surface of one of the high voltage electrodes.

Fig. 6 is a section along the line 6—6 of Fig. 5.

Fig. 7 is a vertical section through the complete ozone generating cell assembly along the line 7—7 of Fig. 8.

Fig. 8 is a horizontal section through the completed cell assembly along the line 8—8 of Fig. 7.

Fig. 9 is a section along the line 9—9 of Fig. 7.

Referring more particularly to the drawings, the cell comprises a plurality of high voltage electrodes 1, a plurality of low voltage or ground electrodes 2, a plurality of glass plates 3 and a plurality of electrically insulating strips 4.

The glass, the electrodes and the insulation between the glass must be chemically clean on all surfaces. The glass is cleaned with a detergent and/or abrasive and distilled water. The electrodes are cleaned with carbon tetrachloride or an abrasive or an aqueous acid bath or other suitable metal chemical cleaners. The insulation, preferably in the form of a plastic such as Bakelite, is cleaned with carbon tetrachloride. After the glass, electrodes and insulation have been chemically cleaned, they are assembled in the order shown in Figs. 1 and 3, to wit: the upper surface of the glass is first given a coating of electrically non-conducting bituminous material, such as asphalt. The asphalt coating 5 can be sprayed on as a liquid and the solvent then driven off, or hot molten asphalt can be sprayed on the glass surface with a spray gun. Upon this thin layer or seal of asphalt 5 is now placed the low voltage or ground electrode 2 which can be made from any metal. Because of its excellent electrically conducting and heat conducting properties the electrode 2 is preferably made from sheet copper. Upon the copper plate or electrode 2 is then placed another sheet of glass 3, the lower surface of which is first completely coated with a thin asphalt seal 5 in the manner above described.

As thus far described the ground electrode 2 is sealed on each face against a glass dielectric 3 by a thin coating or seal of asphalt. Two narrow insulating strips 4 are next placed upon the top surface of the glass positioned in spaced relation along the opposite long sides of the glass plate 3. These electrically insulating strips are made of any suitable material such as Bakelite. Upon these strips 4 is placed another sheet of glass. The upper side of this sheet of glass is first coated or sealed with asphalt as above described and the high voltage electrode 1 is now placed upon the asphalt sealed side of this glass. The high voltage electrode 1 is of smaller area than either the glass or the electrode 2, consequently insulating strips 4 are positioned upon the glass along each side of the electrode 1 and short insulating strips 6 are positioned at each end of the electrode 1. Another sheet of glass, the bottom side of which has been coated with asphalt, is now placed upon the high voltage electrode 1. Two strips of insulating material are now positioned along the sides of this piece of glass and another piece of glass now positioned upon these insulating strips to provide another air chamber between the two contiguous pieces of glass. The top surface of this glass is coated with asphalt and another copper electrode positioned upon the asphalt coated glass, followed by another asphalt coated insulating glass upon this copper electrode. This method is repeated until a seal of the desired number of electrodes is desired.

After the electrodes, glass plates and insulating strips are assembled, as shown in Fig. 3, they are placed in a jig shown in Fig. 2 which consists of a pair of plates 7 secured together by bolts 8. The bolts 8 carry the end plates 9. The sides of the jig are provided with two electrical resistance heating elements 11 carried in refractory plates 12. Between one refractory plate 12 and the side 7 of the jig is placed a bimetal element 10. After the elements are positioned in the jig and the plates 7 drawn down tight by the bolts 8, the switch 13 is closed and heating elements 11 placed in circuit with lines 14 which lead to a source of current, not shown.

The jig and plates are positioned in a hermetically sealed container 15 connected by pipe line 16 with a vacuum pump (not shown). As the heating elements heat the glass sheets 3, the electrodes 1 and 2, and the asphalt, the various parts are sealed together with the asphalt 5 as the sealing medium. At the same time the vacuum pump extracts all the air from between the electrodes and the glass plates so that the asphalt seals the entire area between the glass and the electrodes with a continuous seal free from air bubbles or pockets. As the temperature rises the bimetal element flexes in a manner to increase its curvature and thus press the glass electrodes and sealing medium together.

The seals are cooled while still held under pressure in the jig. After cooling, the glass plates, sealing material, electrodes and fiber spacers are integrated into a single unit due to the binding action of the asphalt.

The unit is now removed from the jig. The spaces 17 between the adjacent glass plates 3 provide air passageways through which the air travels in the high tension silent glow or arcing that transforms the oxygen of the air into ozone. Upon cooling the unit is removed from the jig and each end is closed with a ceramic or porcelain end closure 18. The closure 18 for the one end is identical with that for the other end. The inside periphery of the closure 18 is larger than the periphery of the unit as removed from the jig. Therefore the cell end is packed completely around its periphery with a yieldable or cushioning packing material 19 of such material as asbestos or glass cord. The ends 20 of the fibrous spacers 4 project beyond the ends of the glass plates 3 so that they space the cell end 18 from the ends of the glass and prevent the glass from ever contacting with the cell ends 18. Each cell end is provided with an opening 21. The air inlet cell end is positioned with the opening 21 uppermost where it connects with the air inlet line 22, Fig. 7. The ozone and air outlet cell end is arranged with the opening 21 adjacent the bottom where it connects with the ozone outlet line 23. Note that the ozone air outlet 21, 23 is positioned slightly below the bottom surface 24 of the air passageway 17. The bottom 24 of the air passageway 17 is the top face of the lower insulating strips 4. Thus if any moisture gathers in the cell it will drain out of the air passageway openings through outlet 23. This drainage is further facilitated by mounting the cell within its metal container 25 so that it is inclined downwardly toward the opening 23. This is achieved by positioning a shim or spacer member 26 beneath the cell end 18 for the air inlet end of the ozone cell.

The cell unit with the ends 18 is now positioned in the metal container 25 and a plastic material is now poured completely around the cell unit. The plastic material should be an electrical non-conductor, inert to ozone and plastic at all temperatures to which the cell is subjected during the several seasons of the year. Preferably the plastic material is a bituminous material such as asphalt. Thus the cell is embedded on all sides and completely immersed in the asphalt 27. After the entire assembly is finished there is no spot which would prevent the glass from expanding and contracting over normal limits. This bituminous material preferably is a low melting point asphalt such as is sold at present under the trade name of "Korite." This asphalt is a plastic material and under all atmospheric and operating temperatures to which the cell unit is subjected remains plastic and yieldable. This asphalt gives a cushioning action as the temperature rises and falls and thus cushions the normal expansion and contraction of the glass plates.

Prior to pouring the hot asphalt 27 into the casing 25 a cooling coil 29 is positioned above the cell and clamped between the upstanding fingers 30 of the low voltage electrodes. These fingers 30 serve as heat radiating or dissipating fins which dissipate the heat conducted out of the ozone cell by the copper electrodes 2. The heat exchange is affected by the copper cooling coil 29 and the fingers 30. Any suitable coolant, such as water, is circulated through the copper coil 29. Where the cell is only operated intermittently for a small period of time, say, one to five minutes, with an intervening period of say, five minutes, the cooling coil is not necessary. The low voltage copper electrodes 2 are mounted in parallel and grounded to the cooling coil 29 which connects with the water pipe line leading to the source of cooling water. The high voltage electrodes are each provided with leads 31 which are connected in parallel with the high voltage side of the transformer 32.

The high voltage electrode 1 is very carefully designed to reduce spark discharge from edges and rough surfaces. The entire edge or periphery of each electrode 1 is rounded off for this purpose as at 33, Fig. 3. The curvature of the edges should be on an arc approximately one-half of the thickness of the plate. Thus, where the electrode plate 1 is one-sixteenth of an inch thick, its entire periphery should be rounded off about an arc of approximately one-thirty second of an inch radius. The plate should be thick enough to permit a reasonable radius on the edge of the plate. The surface of the electrode material, which may be steel or iron, is polished to remove points which might exist in the material. The electrical connection is made to this plate through a lead 31, the edges of which are also rounded off and which is attached to the plate to avoid any sharp points. The plate is provided with curved corners 35 which reduce spark discharges.

The ground electrode 2 need not have the edges rounded off as carefully as the high voltage electrode. The reason for this is that the low voltage electrode is larger in size than the high voltage electrode which brings the edges of the plate out of influence of the electrical field which exists between the two electrodes. Note that the copper electrode 2 extends beyond the high voltage electrode 1 throughout the entire periphery, see Figs. 3 and 4. This low voltage electrode is the larger of the two eelctrodes for the above reason and also because it is desirable for this electrode to cover most of the surface of the glass plates for the purpose of temperature control. The copper plates are extended beyond the edge of the glass on one side of the cell in the form of fingers 30 which are soldered to the water line 29.

Because of the method of cooling the heart of this cell structure it is possible to build the cell as large as one would desire and still obtain the desired cooling. The sheets of glass can be quite large and the number of sheets stacked on top of each other with the intervening electrode can be as many as desired.

The high voltage electrical connections to this cell can be well separated and well insulated and can be imbedded along with the transformer in the asphalt. This would mean a box large enough and of the correct shape to house the high voltage transformer and the ozone generator, they both being hermetically sealed in the asphalt. The low voltage leads to the transformer extending out of the asphalt but the high voltage leads are imbedded in the asphalt. The ground side of the high voltage circuit is connected to the water line and the low voltage plates, while the high voltage side of the circuit is connected to the high voltage plates. The close proximity of the transformer also reduces the tendency of radio frequency interference and the ground electrode, being larger than the high voltage electrode, and the edge of the low voltage electrode extending beyond the electrical field existing between the electrodes, also assists in reducing radio frequencies. This careful control of radio frequencies tends to reduce the dielectric strain of the glass plates, which also reduces the tendency for heating of the dielectric.

The glass plates, as well as the electrodes and the spacers, must be chemically clean before they are sprayed with the asphalt. Certain dielectrics, such as glass, have a peculiar tendency of conducting current along the surface of the material. This is due to deposits of dirt and moisture on the surface. This is a condition which must be guarded against very carefully in the construction of an ozone generator.

We accomplish this by the spraying of the glass and the other parts after they have been chemically cleaned. Materials such as asphalt sprayed on the glass do not permit the current to travel along the surface of the glass if the glass is first chemically cleaned and the asphalt properly applied. The asphalt or other similar material effects a good, strongly adherent bond with the glass, electrodes and other parts which seal or bond is not broken upon temperature change because of the adhesive and elastic or cushioning properties of the adhesive or bonding material.

The use of this construction comprising a plurality of glass plates and electrodes properly cooled permits the assembly of an unlimited number of ozone creating sections at a low cost. With this construction it is possible to use a lower voltage than has been customary and add additional sections to the cell to produce the same amount of ozone that could be produced with a higher voltage and less sections in the cell. This permits one to build an ozone cell at a small cost without working the dielectrics anywhere near the danger point. The uniform cooling and safe working voltage will assure an indefinite life for this construction.

The bituminous material preferred is a low melting point asphalt which remains plastic or non-brittle at 50° F. below zero and will not melt at temperatures as high as 175° F.

I claim:

1. An ozone generating cell comprising high and low voltage electrodes mounted in spaced relation with their faces opposed, a dielectric in the form of a glass plate for each of the opposed electrodes, means for spacing the said glass plates and electrodes, and a bituminous material for sealing each of the glass plates to its respective electrode approximately throughout the entire face of the electrode whereby air is excluded between the electrode and the face of the glass and the glass plates are free to expand and contract without breakage due to atmospheric temperature changes.

2. An ozone generating cell comprising high and low voltage electrodes mounted in spaced relation with their faces opposed, a dielectric in the form of a glass plate for each of the opposed electrodes, means for spacing the said glass plates and electrodes, and a plastic material which is plastic throughout a range of temperatures from below freezing and upwards of 120° F. for sealing each of the glass plates to its respective electrode approximately throughout the entire face of the electrode whereby air is excluded between the electrode and the face of the glass and the glass plates are free to expand and contract without breakage due to atmospheric temperature changes.

3. An ozone generating cell comprising high and low voltage electrodes having opposed faces, a pair of glass plates sealed to the top and bottom faces of each of the said electrodes, spacing means between the opposed glass plates to provide a passageway for the air to be ozonized, and a seal between substantially the entire surfaces of the electrodes and the glass plates, of a plastic material which is plastic throughout a range of temperatures from below zero to above 120° F. whereby the glass plates are free to expand and contract without breakage due to temperature changes.

4. An ozone generating cell comprising high and low voltage electrodes having opposed faces, a pair of glass plates sealed to the top and bottom faces of each of the said electrodes, spacing means between the opposed glass plates to provide a passageway for the air to be ozonized, and a seal between substantially the entire surfaces of the electrodes and the glass plates, of a bituminous material which is plastic throughout a range of temperatures from below zero to above 120° F. whereby the glass plates are free to expand and contract without breakage due to temperature changes.

5. An ozone generating cell comprising high and low voltage electrodes having opposed faces, a pair of glass plates sealed to the top and bottom faces of each of the said electrodes, spacing means between the opposed glass plates to provide a passageway for the air to be ozonized, and a seal between approximately the entire surfaces of the electrodes and the glass plates, of a plastic material which is plastic throughout a range of temperatures from below zero to above 120° F. whereby the glass plates are free to expand and contract without breakage due to temperature changes, a casing for the said cell, a plastic material in the casing and completely surrounding the said cell, the said plastic material being plastic at all atmospheric temperatures whereby the cell is hermetically sealed against dust and moisture.

6. An ozone generating cell comprising high and low voltage electrodes having opposed faces, a pair of glass plates sealed to the top and bottom faces of each of the said electrodes, spacing means between the opposed glass plates to provide a passageway for the air to be ozonized, and a seal between approximately the entire surfaces of the electrodes and the glass plates, of a bituminous material which is plastic throughout a range of temperatures from below zero to above 120° F. whereby the glass plates are free to expand and contract without breakage due to temperature changes, a casing for the said cell, a bituminous material in the casing and completely surrounding the said cell, the said bituminous material being plastic at all atmospheric temperatures whereby the cell is hermetically sealed against dust and moisture.

7. A method of fabricating an ozone generating cell comprising the steps of chemically cleaning a plurality of glass plates and an electrode and heating the same to drive off the moisture, coating a surface of each of the cleaned glass plates with a bituminous material, applying the coated surfaces of the glass plates to opposite sides of the electrode whereby the electrode is sealed between the said glass plates and sealed from the atmosphere by the bituminous coating, and pressing the glass plates and electrode together under a vacuum.

RICHARD J. SCHAEFER.